(No Model.)
J. WRIGHT.
BELT STRETCHER.
No. 506,296. Patented Oct. 10, 1893.
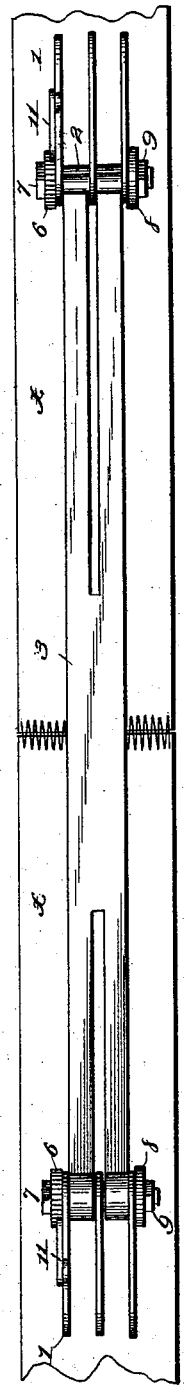
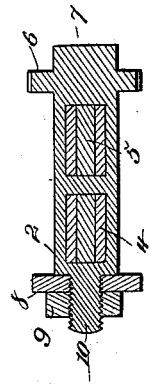
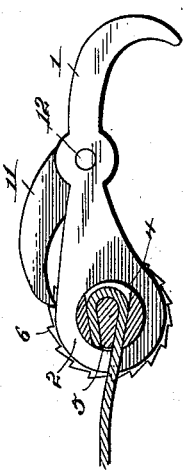
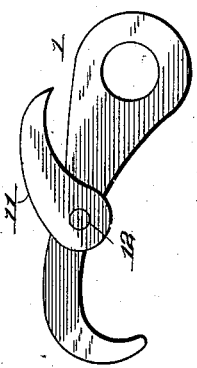
Witnesses:
J. M. Fowler
H. S. Rohrer
Inventor:
James Wright
By
Glascock & Co.
Attorneys

United States Patent Office.

JAMES WRIGHT, OF JACKSON, TENNESSEE.

BELT-STRETCHER.

SPECIFICATION forming part of Letters Patent No. 506,296, dated October 10, 1893.

Application filed November 19, 1892. Serial No. 452,518. (No model.)

*To all whom it may concern:*

Be it known that I, JAMES WRIGHT, a citizen of the United States, residing at Jackson, in the county of Madison and State of Tennessee, have invented a certain new, useful, and valuable Improvement in Belt-Tighteners, of which the following is a full, clear, and exact description.

My invention has relation to devices for tightening elevator, drag, or other belts and holding them in place until laced or riveted. The device is adapted to tighten the said belts without removing them from the pulleys and the said device consists of the novel construction and arrangement of its parts as hereinafter described.

In the accompanying drawings:—Figure 1, is a plan view of the ends of a belt having my device attached thereto:—and Figs. 2, 3, 4 and 5, are detailed views of different parts of the device.

The device consists of two similar metallic sets of grippers 1, loosely journaled on the drums 2. These drums are connected by a suitable belt, chain, or rope 3, preferably a belt as shown in the drawings. Each set of grippers may consist of two or more pieces, (drawings show three,) and a suitable slit is cut in each end of the belt 3, to permit the said belt to wind around the drums 2, without interfering with the gripper journaled in the middle of the drum. The drum 2, is provided with a slot 4, having converging sides and extending from one end of the drum to the other and located in the said slot 4, is a wedge shape section 5. The ends of the belt, chain, or other connecting element are caught around the wedge shape section 5, as shown in Fig. 2. One end of the said drum 2, is provided with an integral collar 6, having ratchets on its periphery and on the outer side of this collar 6, is an integral tap 7, rectangular in shape and adapted to be operated with a wrench. The other end of the drum 2, is provided with a removable collar 8, said collar 8, being held in place by a tap 9, which screws on the threaded end 10, of the said drum 2.

The gripper 1, journaled on the drum 2, next and the collar 6, is provided with a suitable pawl 11, journaled to the said gripper at point 12, said pawl being adapted to engage the ratchets on the periphery of the collar 6, as shown in Fig. 2.

My invention is operated as follows:—The grippers 1, are caught in perforations in each end of the belt $x$, then the belt 3, is wound around the drums 2, by using a wrench or either the tap 7, or 9, of the said drum and when the belt $x$, is sufficiently tight its ends can be brought together and riveted or sewed without removing the tightener. When the ends of the belt $x$, are screwed together the tightener is removed and the belt $x$, is ready for use.

Having described my invention, what I claim as new, and desire to secure by Letters Patent, is—

1. A belt tightener consisting of two similar metallic drums and attachments, each drum having loosely journaled on it a set of grippers the hooked ends of which are adapted to catch in perforations in the belt to be tightened; said drums being connected by a suitable belt; one end of each drum being provided with a ratchet and one gripper on each drum being provided with a pawl, said pawl being adapted to engage the said ratchet substantially as shown and described.

2. In a belt tightener substantially as shown and described a drum having journaled thereon suitable grippers, said drum being also provided with a suitable ratchet and pawl; the slot passing through the said drum and having converging sides and a wedge shape section located in said slot, said slot and section being adapted to hold the end of a belt substantially as shown and described.

In testimony whereof I affix my signature in presence of two witnesses.

JAMES WRIGHT.

Witnesses:
L. E. TALBOT,
F. A. COLLINS.